May 25, 1948.   G. F. HUGHES-CALEY   2,442,202
BEARING
Filed Sept. 3, 1943
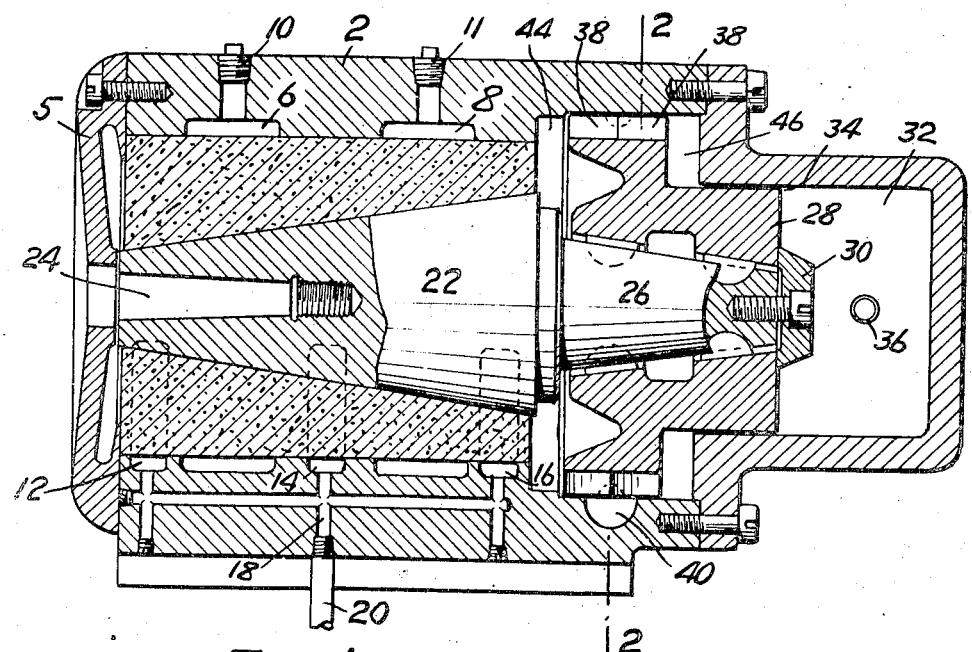
FIG. 1.
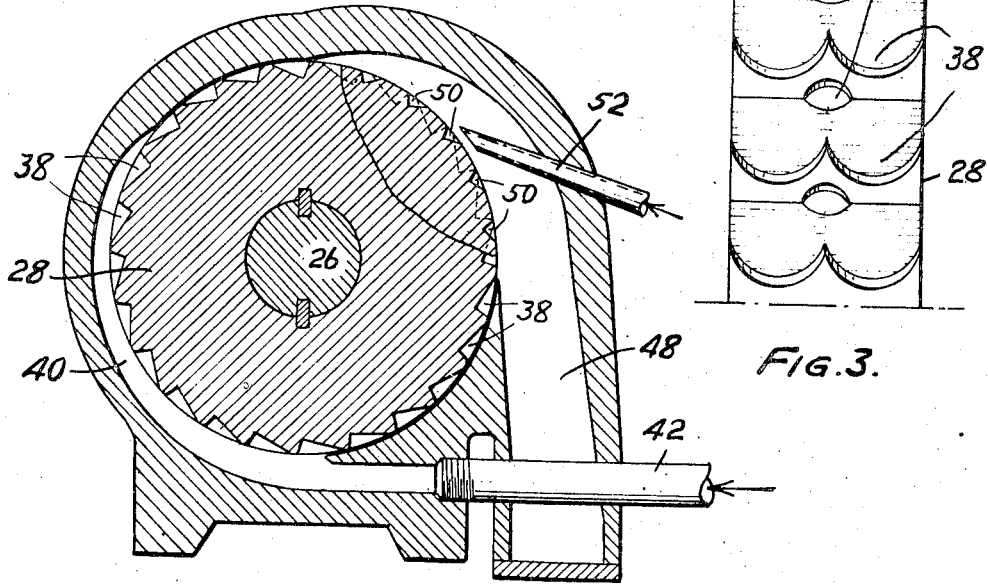
FIG. 2.
FIG. 3.
WITNESS:
Robt P Kitchel
INVENTOR
George Frederick Hughes-Caley
BY
ATTORNEYS.

Patented May 25, 1948

2,442,202

UNITED STATES PATENT OFFICE 2,442,202

BEARING

George Frederick Hughes-Caley, New York, N. Y., assignor, by mesne assignments, to General Register Corporation, Long Island City, N. Y., a corporation of New York Application September 3, 1943, Serial No. 501,049

2 Claims. (Cl. 308—122)

This invention relates to a bearing suitable for grinding and fine boring within extremely close tolerances.

In grinding and fine boring to very close tolerances with the production of surfaces showing a minimum of markings, it is essential that the grinding or boring spindle be so mounted as to minimize vibration thereof in both radial and axial directions. At very high speeds, of the order of 30,000 to 40,000 R. P. M., it is essential that a proper lubricating oil film be maintained at the bearing surfaces. This implies that clearances must exist so that the film is not squeezed out of the bearing, the result of which would be seizure and destruction of the bearing.

It is the general object of the present invention to provide a bearing arrangement in which proper lubricating oil films will be maintained at very high speeds of rotation while, at the same time, there will be avoided such play as will permit undesirable vibrations to occur. Specifically, this is accomplished by the provision of a bearing of tapered form with the application of end thrust with accompanying damping of axial vibrations.

It is found that greatly improved operation can be secured with a minimum of friction by causing the lubricant to be not solely oil but an intimate oil-air mixture which in accordance with the present invention is provided in connection with a porous metal bearing.

The above and other objects of the invention, particularly relating to details of construction, will become apparent from the following description read in conjunction with the accompanying drawing, in which:

Figure 1 represents an axial section through a bearing arrangement provided in accordance with the invention;

Figure 2 is a section taken on the broken surface, the trace of which is indicated at 2—2 in Figure 1; and Figure 3 is a fragmentary elevation of a portion of the periphery of the driving turbine wheel.

The head casting 2 supports a tapered bearing 4 of the porous metal type containing lubricating oil in its pores and arranged to exude the same to provide a lubricating film. In a bearing such as this there is little wastage of oil, but it is desirable to provide an adequate supply of oil by filling annular cored spaces 6 and 8 surrounding the bearing with oil. These may be closed by plugs 10 and 11 since in general they require replenishment only at extended intervals. In accordance with the present invention, there are additionally provided cored semi-circular grooves 12, 14, and 16 embracing the lower portions of the bearing 4 and arranged to be supplied with air under pressure through the passage 18 communicating with the supply pipe 20. The radial ends of the metal bearing are desirably closed off either by electroplating or by burnishing in known fashion. If air under pressure is supplied, it is found that this permeates the bearing leaving the same mixed with oil at the bearing surface of the spindle 22 located in the bearing. The mixture of air and oil which may be likened to an emulsion provides very effective lubrication but with a very slight friction due, perhaps, to the effective lowering of viscosity by reason of the presence of the dispersed air.

The tapered spindle 22 which is located in the bearing and limited by the tapered form in its movement toward the left as viewed in Figure 1 is provided with a tapered socket 24 for the reception of the spindle of a grinding wheel, suitable boring cutter, or the like. It may be noted that fine boring using a tungsten carbide or diamond tool with either the work mounted on the spindle or a fly cutter mounted on the spindle may be carried out at a high surface speed for soft metals, for example of the order of 13,500 inches per minute.

The spindle 22 has a rear extension 26 on which a driving rotor 28 is secured by means of a clamping arrangement indicated at 30. The rotor 28 may take any desirable form and may, for example, be the rotor of an electrical motor surrounded by suitable field poles, or as in the present instance, may comprise the rotor of an air turbine. The right-hand portion of this rotor extends with relatively slight clearance into a fluid space 32, the clearance being indicated in exaggerated fashion at 34. The space 32 is fed with fluid through the opening indicated at 36 whereby a pressure may be applied to the rotor and the spindle, the rotor acting as a piston urged toward the left as viewed in Figure 1 by the application of fluid pressure. The fluid may be air or a liquid such as hydraulic oil. In case an air turbine drive is used, the fluid may well be air which while continuously escaping through the clearance 34 into the exhaust passage of the turbine will exert the desired pressure to maintain the spindle 22 seated properly in the bearing but with the maintenance of the proper lubricating film.

The turbine itself forms no part of the present invention but is provided with buckets 38 forming what resembles a Pelton wheel driven by air entering the buckets from the space 40 which is fed with air through the connection 42. The air is discharged in opposite axial directions from the buckets and passes to the exhaust passages 44 and 46 which communicate with a discharge passage 48.

It is desirable to provide braking for the spindle since because of the low friction involved together with the high speeds, much time would be lost between operations waiting for the spindle to come to rest. Because of the delicate nature of the bearing arrangement it is not desirable to use mechanical braking unless this is applied in very well balanced fashion to avoid any undue eccentric stresses. Preferably, pneumatic braking is used involving the discharge of air from a nozzle 52 upon reversely arranged buckets 50 in the periphery of the rotor. The friction induced by such a stream of air will rapidly bring the wheel to rest without the exertion of any forces tending to injure the mounting.

It is not new to apply axial pressure to a tapered spindle to seat it in its bearing, and the use of springs has been proposed for this purpose. The use of fluid pressure, however, offers the very necessary advantage of effecting damping of axial vibrations which the presence of a spring will promote rather than prevent. Thus, not only may the axial force upon the spindle be adjusted but stable rotation without axial oscillations will be insured. Radial oscillations are prevented to a degree dependent upon the axial force since they can occur only by reason of the film thickness in the bearing which may, by the present arrangement, be minimized or controlled to any desired degree.

Instead of applying the pressure hydraulically, it may be applied by the application of a magnetic force which also may be arranged to provide damping through the formation of eddy currents in a suitable portion of the rotor.

The intimate oil-air mixture over the bearing area, though of extreme thinness, has a high tenacity due to the pressure under which the lubricant is forced to the surface of the bearing bushing. This feature has been found not only to reduce the turning effort required to start the spindle rotating but makes it run properly without the usual necessary warming up period which is customary on high speed bearings.

In starting up the spindle it is desirable that the axial pressure should be applied first, then the air pressure, on the bearing through the connection 20, and finally the driving air pressure through the connection 42.

It will be evident that while the bearing has been mentioned as primarily advantageous in grinding or fine boring, it is suitable for other high speed machining operations where precision of dimension and high finish are necessary or where accurate location of a rotary member and the damping of vibrations are required.

What is claimed is:

1. In combination, a bearing of porous metal type, a spindle mounted in the bearing, and means for supplying compressed gas to the bearing to provide a gas-oil mixture at the bearing surfaces.

2. In combination, a tapered bearing of porous metal type, a spindle mounted in the bearing, and means for supplying compressed gas to the bearing to provide a gas-oil mixture at the bearing surfaces.

GEORGE FREDERICK HUGHES-CALEY.

REFERENCES CITED

The following references are of record in the file of this patent:

UNITED STATES PATENTS

| Number | Name | Date |
| --- | --- | --- |
| 633,862 | Lighthall | Sept. 26, 1899 |
| 1,102,749 | Hauer | July 7, 1914 |
| 1,254,424 | Minnie et al. | Jan. 22, 1918 |
| 1,433,223 | Olson | Oct. 24, 1922 |
| 1,478,338 | Isom | Dec. 18, 1923 |
| 1,567,018 | Arnsden | Dec. 22, 1925 |
| 1,810,296 | Sauer | June 16, 1931 |
| 1,873,146 | Patch | Aug. 23, 1932 |
| 2,093,360 | Jaynes | 1937 |
| 2,124,479 | Whitaker | July 19, 1938 |
| 2,228,406 | Schmidt | Jan. 14, 1941 |

FOREIGN PATENTS

| Number | Country | Date |
| --- | --- | --- |
| 4,165 | Australia | 1926 |